J. H. ELWARD.
HARVESTER.

No. 178,127. Patented May 30, 1876.

Witnesses: Inventor:
John H. Elward
by A. M. Smith,
Attorney.

2 Sheets—Sheet 2.

J. H. ELWARD.
HARVESTER.

No. 178,127. Patented May 30, 1876.

Witnesses:

Inventor:

UNITED STATES PATENT OFFICE.

JOHN H. ELWARD, OF ST. PAUL, MINNESOTA, ASSIGNOR TO ST. PAUL HARVESTER WORKS, OF SAME PLACE.

IMPROVEMENT IN HARVESTERS.

Specification forming part of Letters Patent No. 178,127, dated May 30, 1876; application filed May 17, 1876.

*To all whom it may concern:*

Be it known that I, JOHN H. ELWARD, of St. Paul, county of Ramsey, State of Minnesota, have invented a new and useful Improvement in Harvesting-Machines, of which the following is a full, clear, and exact description, reference being had to the accompanying drawing, making part of this specification, in which—

Figure 1:
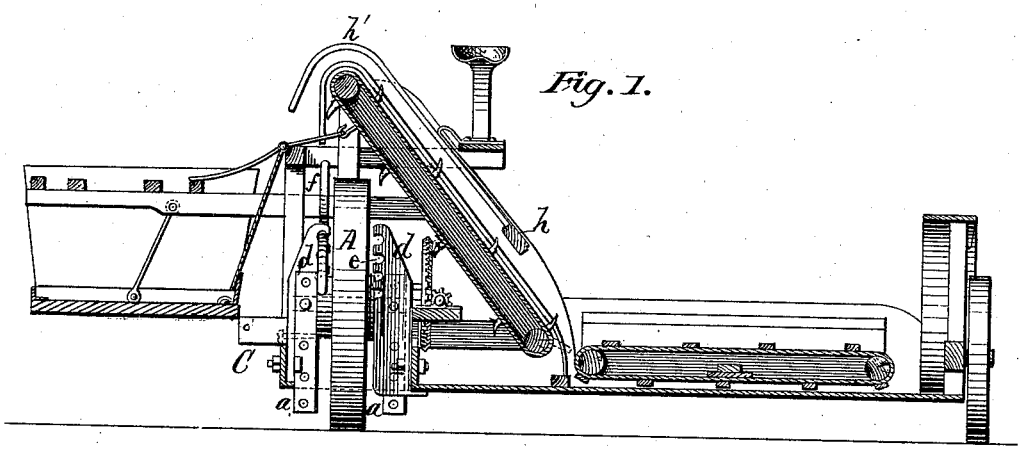
Figure 2:
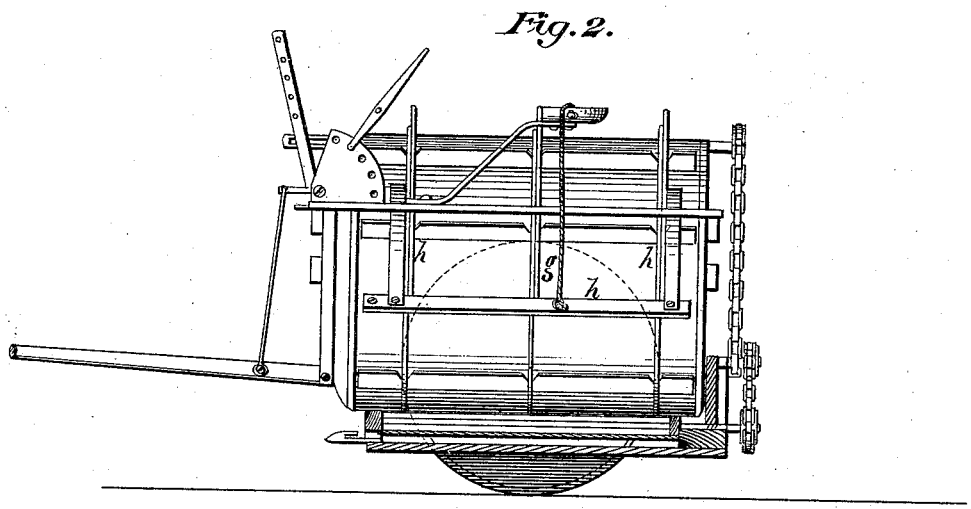

Figure 1 is a vertical transverse section through a harvesting-machine, having my improvements applied. Fig. 2 is a vertical longitudinal section, taken on the grain side of the elevator, and showing the means for raising the yielding pressure-board, and Figs. 3, 4, 5, and 6 represent the driving-wheel and portions of the main frame, showing modifications in the form of the devices for adjusting the height of the main frame and cutting apparatus.

Similar letters of reference denote corresponding parts wherever used.

My invention relates to a novel method of adjusting the main frame upon the drive-wheel for changing the height of cut, and consists in the employment of a removable lever, adapted to be used in connection with the main frame and drive-wheel, using the latter as a fulcrum for the lever in effecting the required adjustment of the frame, as hereinafter described.

Figure 3:
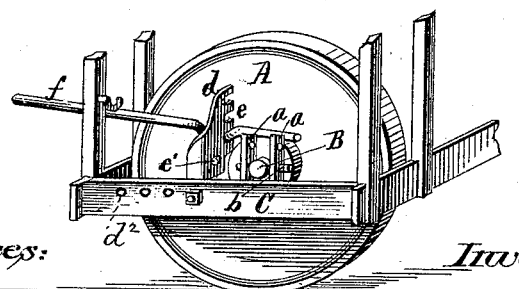
Figure 4:
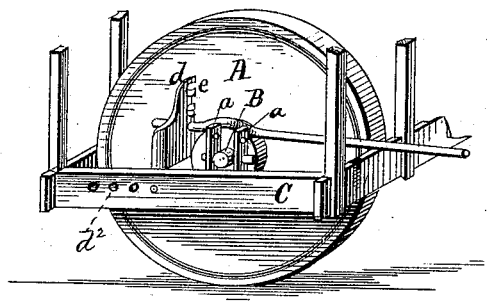
Figure 5:
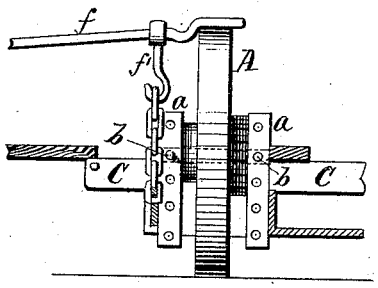
Figure 6:
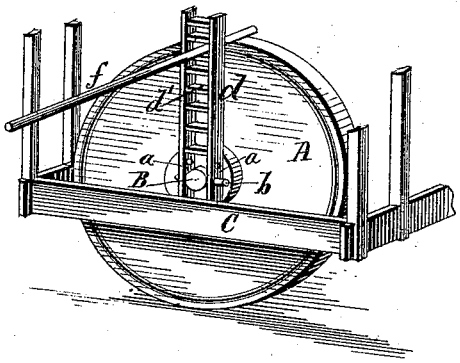

In the accompanying drawings, A represents the drive-wheel; B, the axle, and C the main frame; said parts, together with the platform-apron, elevator, binders' platform, and their several attachments, except in details hereinafter specified, being constructed and arranged as described in former applications, or in any usual or preferred manner. The axle B has its ends flattened and secured between parallel standards or ribs $a\,a$, secured to the inner sides of the adjacent frame-timbers, and pins $b$, passing through said standards and through the ends of the axle, serve to unite the axle and frame; a series of such perforations in the ribs or standards through any of which the retaining-pins may pass, serving to permit the frame to be be held at any desired height. Other means of fastening the axle may be employed, but the above, as it serves not only to prevent the rotation of the axle but to make of it a transverse bar for stiffening the main frame, is preferred. Upon the main frame, in front or in rear of the axle, either or both, is secured an adjustable standard, $d$, (see Figs. 1, 3, and 4,) connected with the frame through any of a series of perforations, $d^2$, and provided on its inner side, adjacent to the driving-wheel, with a rack or series of notches or teeth at $e$, or, if preferred, with perforations, as at $e'$, in any one of which a lever, $f$, may be inserted and made to rest upon the wheel, or its hub or axle, as a fulcrum, and to act as a lever either of the first or third order, according to the side of the standard from which it is inserted, as shown in the drawings, Figs. 3 and 4. By inserting the lever $f$, as shown in Fig. 3, the attendant, by lifting on the long arm of the lever, takes the weight of the standard and of the frame to which the standard is attached, until the pins $b$ or other fastening securing the axle are withdrawn, when the frame can be raised or lowered, by means of the lever, to the desired point, when the fastenings are replaced, securing the wheel and frame at the desired relative adjustment. The standard is made adjustable to adapt it to be changed to suit the convenience of the attendant in adjusting the particular machine to which it may be applied, and to vary the leverage according to the weight to be lifted. In Fig. 4 the lever is represented as of the third order, and its movement is reversed—that is to say, the long arm is depressed for lifting the frame, the wheel or its hub or axle serving, in both cases, as the fulcrum, as shown. In Fig. 5 a modification is shown in the manner of connecting the weight to be adjusted (viz., the frame) with the lever, consisting of a hook, $f$, attached to the lever and a chain attached to the frame, with any one of the links of which the hook of the lever may be connected, the lever acting as a lever of the first order, and using the wheel as a fulcrum; or the standards or ribs $a\,a$, between which the axle is adjusted, may be extended upward beyond the limit of adjustment of the axle relative thereto, to form the standard $d$, and provided with a number of rounds or connecting-bars, $d^1$, as in Fig. 6, in which case the lever may be applied from either side, and, using the wheel as a fulcrum, may be used as a lever either of the first or third order, according to the attendant's convenience in applying it. Thus the form of the standards and the manner of applying the lever for adjusting the frame may be varied as the form or construction of the machine may dictate, for convenience in effecting the adjustment. The lever, when not in use, is removed, and is placed in any convenient pocket or receptacle on the machine adapted to receive and carry it.

In Fig. 2 I have shown the yielding compressing-board $h$, which, with its rods or wires $h'$, hold the grain down upon the elevator-apron, with a cord, $g$, attached at or near midway of its length, said cord extending up to the drivers' seat, for enabling the driver, whenever there is any undue accumulation of grain at the foot of the elevator, to lift the pressure-board $h$, and thus permit the passage of the accumulated grain underneath it. This is important where the grain is heavier than an average crop, to which the pressure-board is adapted in the construction of the machine.

Having now described my invention, what I claim as new, and desire to secure by Letters Patent, is—

1. The main frame of a harvesting-machine, provided with a rack-standard, $d$, or its equivalent, in combination with the removable lever $f$, applied to and using the main drive-wheel as a fulcrum for effecting the adjustment of the frame, substantially as described.

2. The rack-standard $d$, made adjustable upon the main frame, for the purpose and substantially as described.

In testimony whereof I have hereunto set my hand this 1st day of May, A. D. 1876.

JOHN H. ELWARD.

Witnesses:
 W. SARGENT,
 W. J. DEAN.